United States Patent [19]
Bentley

[11] 3,894,272
[45] July 8, 1975

[54] METHOD AND APPARATUS FOR DETERMINING INCIPIENT GROUNDING OF A HIGH VOLTAGE ELECTROSTATIC SYSTEM

[75] Inventor: Stanley L. Bentley, Indianapolis, Ind.

[73] Assignee: Ransburg Corporation, Indianapolis, Ind.

[22] Filed: Aug. 16, 1974

[21] Appl. No.: 498,088

Related U.S. Application Data
[62] Division of Ser. No. 433,265, Jan. 14, 1974, Pat. No. 3,851,618.

[52] U.S. Cl. .................................. 317/3; 317/18 C
[51] Int. Cl.² .... B05B 5/02; H02H 3/16; H02H 7/00
[58] Field of Search .......... 317/3, 18 R, 18 A, 18 C

[56] References Cited
UNITED STATES PATENTS

| | | | |
|---|---|---|---|
| 2,509,277 | 5/1950 | Ransburg et al. | 317/3 |
| 2,767,359 | 10/1956 | Larsen et al. | 317/262 R |
| 2,821,665 | 1/1958 | Brastad et al. | 317/18 C |
| 3,619,723 | 11/1971 | Walden | 317/18 R |
| 3,622,839 | 11/1971 | Abrams | 317/3 |
| 3,641,971 | 2/1972 | Walberg | 317/262 R |

Primary Examiner—L. T. Hix
Attorney, Agent, or Firm—Merrill N. Johnson; David H. Badger

[57] ABSTRACT

This invention provides a method and apparatus employing the currents of a high voltage electrostatic system to determine incipient grounded conditions. The electric current in the ground return to its high voltage electrostatic system is sensed to provide a signal. All alternating current components of the signal above substantially pure direct current are attenuated to provide a resulting DC signal that increases as a grounded article approaches a charged electrode. In one embodiment the resultant DC signal is sampled at a rate fast enough to anticipate the fastest expected approach of a grounded article to the charged electrode. Every other sample is retained so that it may be compared with the sample immediately following it. The samples are compared in a summing circuit which provides a signal corresponding to the change in conditions in the ground return circuit. A level is selected corresponding to incipient grounding of the charged high voltage electrode. If a difference of the successive samples exceeds this level, an alarm is actuated providing a useful output.

11 Claims, 4 Drawing Figures

METHOD AND APPARATUS FOR DETERMINING INCIPIENT GROUNDING OF A HIGH VOLTAGE ELECTROSTATIC SYSTEM

This application is a division of U.S. Pat. application Ser. No. 433,265, filed Jan. 14, 1974 now U.S. Pat. No. 3,851,618.

This invention relates to a method and apparatus for determining when a sharp-edged electrode charged to high voltage in an electrostatic system is being approached by a grounded object in such a manner that dielectric breakdown of the atmosphere surrounding the high voltage electrode may occur with a resultant disruptive discharge of electric energy stored on the high voltage electrode to the grounded object. Common industrial systems include electrostatic coating systems which use high voltage electrodes to charge and deposit coating material particles on an article. This invention particularly relates to a method and apparatus to be employed in such systems.

In industrial systems using electrostatics, potentials employed may be as high as 100,000 volts or more. These systems include high voltage sources to provide such potentials. Customarily, one terminal of the high voltage source is electrically grounded or connected to earth at zero potential. A high voltage electrode is commonly connected to the other potential of the high voltage source. In most such industrial systems, the high voltage electrode has a portion with a very small radius of curvature which can be referred to as "sharp." In most such systems, the sharp portion of the high voltage electrode is used to perform some operation Electrostatic coating systems use high voltage in many different ways to accomplish deposition of coating materials. Several of these ways are disclosed in U.S. Pat. Nos. 2,893,893; 2,893,894; Re. 24,602; 3,048,498; 3,169,882 and 3,169,883.

The term "electrostatic field" is used to designate the condition in space existing in the region occupied by two spaced electrodes. An "electrostatic field," in a sense, depicts the manner in which the energy stored in the high voltage electrostatic system is distributed throughout the region between the high voltage electrode and the grounded electrode or electrodes. Where the high voltage electrode is sharp, the energy of the electrostatic system is concentrated adjacent to the sharp edge of the high voltage electrode. This concentration of energy is generally described by stating that the electrostatic field has a high intensity in this region. The intensity of an electrostatic field is measured by its potential gradient to indicate how the energy of the field is distributed throughout the region between the electrodes, generally in such terms as kilovolts per centimeter.

Gases (including air which is a composite of many gases) may be ionized by the energy of an intense electrostatic field. If, for example, molecules of the gases forming air are exposed to an intense electrostatic field where the local potential gradient is about or above 30 kilovolts per centimeter, electrons are torn from the molecules under the action of the intense field and the remaining portions of the molecules are thus ionized (that is, they have a net charge). The ionized gases move in response to the energy of the electrostatic field and may be used as a charging agent for coating material, for example.

One problem, however, is common to high voltage electrostatic systems. Because of the intense electrostatic fields that are used, ionization of the air can proceed under some conditions, to a complete disruption of the space between the high voltage electrode and the grounded electrode. This disruptive electrical discharge takes a form of a spark. Although local potential gradients on the order of 30 kilovolts per centimeter can exist closely adjacent to the sharp portion of an electrode, when the average potential gradient throughout the space between such a high voltage electrode and a grounded electrode exceeds on the order of 12 kilovolts per centimeter, danger of disruptive discharge is great Such disruptive discharge generally carries most of the energy stored in the high voltage electrode to the grounded object. Since this energy can be great, such disruptive discharges can be dangerous.

In the electrostatic coating systems, past attempts to prevent sparking from the high voltage electrodes in use have included attempts to develop a signal from the electrical current flowing from the high voltage to ground. These attempts have included the use of apparatus such as that disclosed in early U.S. Pat. Nos. 2,509,277 and 2,650,329 and later patents based upon this principle, such as U.S. Pat. No. 3,641,971. Other patents for electrostatic coating have attempted to control the voltage applied to the high voltage electrodes in response to the current flowing from that electrode. Such patents are U.S. Pat. No. 2,742,600 and U.S. Pat. No. 2,767,359.

These approaches to the solution of this problem in electrostatic coating have not been completely successful, even though they have put to use improvements in circuit design and components which have been developed since their innovation. Basically, the reason for their inability to provide satisfactory performance was their inability to determine the incipient grounding condition from the electric current flowing in the electrical systems of many industrial plants. Such electric currents include substantial components due to the other influences, such as a substantial 60-cycle component and higher harmonics.

These higher harmonics include components due to the very high charging currents flowing into the filter capacitors of the high voltage source as the output voltage of the secondary of the high voltage transformer exceeds the capacitor filter voltage. Other influences in the high voltage system during its operation include the influence of line transients created by other industrial equipment on the inputs of the high voltage transformer, the high frequency currents due to ionization from the high voltage electrode and other less identifiable transient influences. Most, if not all, of these current components are many times greater than the current component representing the approaching grounded article For example, the signal representing an approaching grounded object is a very small increase in the DC leakage current from the sharp high voltage electrode, on the other of a few microamperes; however, the average DC load current on such systems can be as high as several milliamperes, and the AC current components can be even higher. Because of the variable effect of these transients, users of systems that employed the protective electrostatic coating apparatus of the type disclosed in the patents identified above would set their apparatus so that it would not sporadically initiate a signal in response to such transients. Their systems would not therefore detect incipient sparking in many practical industrial installations.

This invention provides a method and apparatus employing the currents of a high voltage electrostatic system to determine incipient grounded conditions. Specifically, this current is detected in between the ground terminal of the high voltage supply and ground, commonly referred to as the "ground return." By this method and apparatus, the undesirable influences of the DC load currents and AC transients can be eliminated.

In this invention a signal is taken from the ground return current to the high voltage source and is provided with high gain DC amplification and heavy attenuation of all frequencies above several cycles per second. The signal is split into two channels that are summed to provide a determination of incipient grounding.

This operation can be accomplished by a low pass operational network including an active filter synthesized from operational amplifiers and providing a transfer function $$\frac{Vo}{Vi} = \frac{-HWo^2}{S^2 + \alpha WoS + Wo^2}$$

A clock is designed to provide time intervals to create a plurality of sampled signals. The duration of the time intervals is determined by the response time needed to determine that the grounding condition is approaching the high voltage electrode in the system. Two sampling circuits are provided which are gated by signals from the clock. One of the sampling circuits is designed to retain the signal from the filter that it receives during the interval that it is gated and to retain this signal throughout the succeeding interval. The other sampling circuit is gated during the succeeding clock interval — that is, the two sampling circuits are gated alternately. The signal that occurs during the second interval is inverted and compared with the signal being retained from the first interval. This comparison of the signals from successive clock intervals provides a signal level which represents an increase or decrease of the DC current from the high voltage electrode. This signal is fed to a level detector which is variable and can be set to compensate for the varying DC load current conditions of each installation.

When this method and apparatus is used, for example, in an electrostatic coating system, it will react to a grounded part, such as an article to be coated that is swinging on the conveyor, or a misaligned part being carried towards the high voltage electrode on the conveyor, with increasing direct current from the high voltage electrode to the approaching grounded part. This DC signal is sensed in the ground return lead of the high voltage pack. All AC components in the ground return current are rejected while the DC signal is amplified; thus, at the output of the low pass operational network, the signal is a DC level which rises either at the rate of the approaching grounded object, or at the response time of the filter, whichever is slower. The signal is sampled at a rate rapid enough to react to the approaching grounded condition, for example, 120 times per second. Comparison of the successive signal samples is used to determine the approaching grounded condition. Other transients are rejected by this method and apparatus which thus provides a reliable determination of an incipient grounding of the high voltage electrostatic system.

One further feature is built into this system. The retentive sampling circuit has built into it a subtractive signal proportionate to the peak signal level. Thus, when the signal being held (except for the subtractive signal) in this sampling circuit is compared with the signal from the next successive gate interval (time interval), a signal is produced which is proportional to the peak magnitude of the DC signal during the first time interval. Thus, this method and apparatus can determine when the DC current level in the ground return is high enough to indicate the danger of sparking, irregardless of whether it is stable, increasing or decreasing.

This operation can also be accomplished by another operational network that removes all components of the signal above pure DC. This operational network includes a circuit synthesized from operational amplifiers and providing an overall transfer function $$\frac{Vo}{Vi} = \frac{-K}{1 + ST}$$

where K is the gain of the summer. In the operational network, the signal is split into two channels. In one channel the signal is operated upon by the transfer function $$\frac{-ST}{1 + TS}$$

This network provides gains to only AC components of the signal. In the other channel the signal is only provided with a phase shift corresponding to the phase shift imposed on the signal by the operational network in the first channel. The two signals are then combined to result in the cancellation of the signal components above essentially pure DC. The resulting DC signal is then amplified and fed to a level detector which is variable and can be set to compensate for the varying DC load conditions of these installations.

Figure 1:
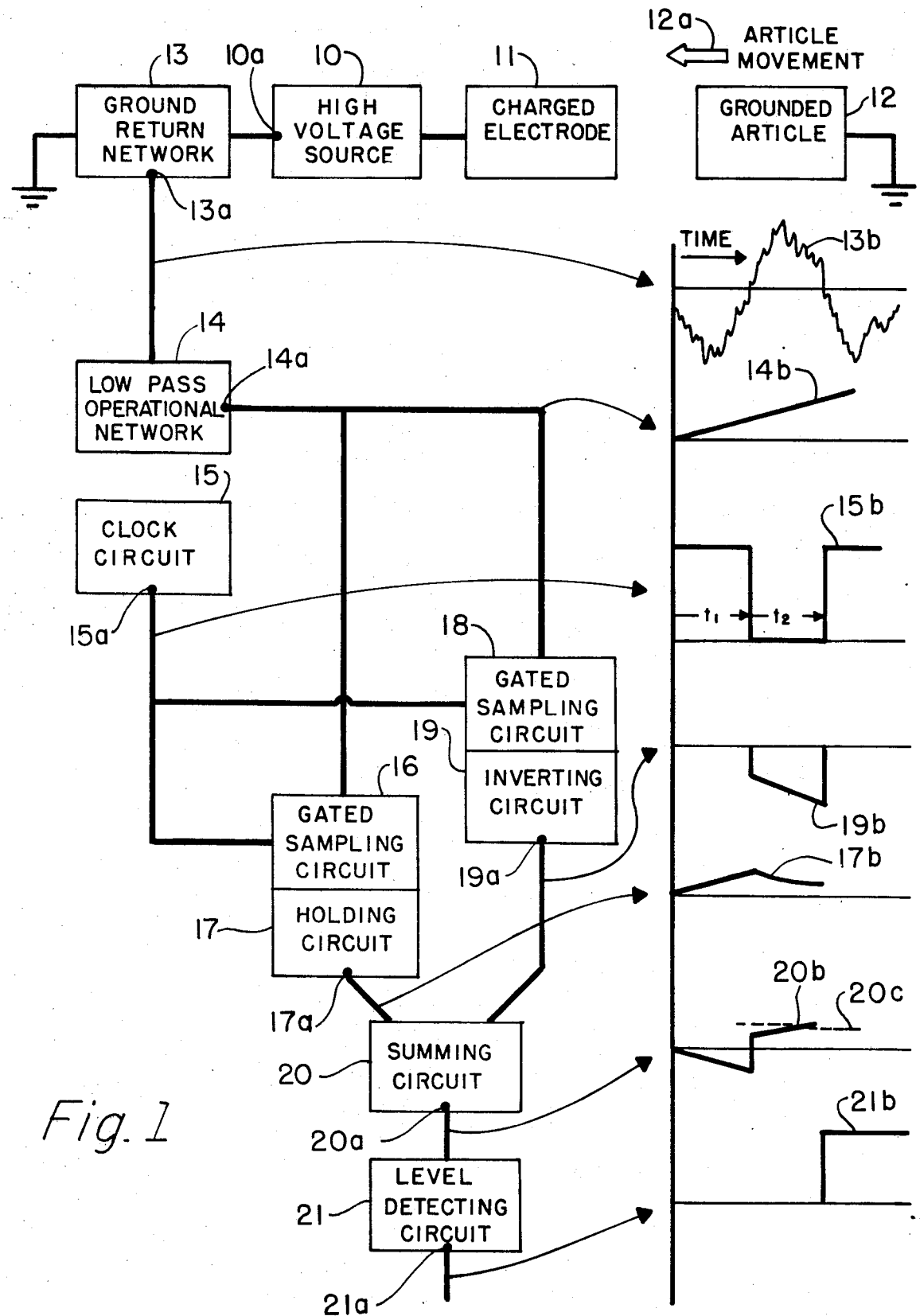
FIG. 1 is a block diagram showing the major components of one apparatus of this invention, and its method of operation for determining incipient grounding of the high voltage electrostatic system.

FIG. 1 shows a typical high voltage electrostatic system in block diagram form. This system includes high voltage source 10, a charged high voltage electrode 11, and grounded article 12. In electrostatic coating systems, the grounded article 12 is free to move in the direction of the charged electrode 11, shown by arrow 12a. Movement of the grounded article 12 in the direction of the charged electrode 11 will result in an increased flow of electrical current across the space between the charged electrode and the grounded article. This electric current will continue to increase until the space between the charged electrode and the grounded article breaks down and a spark is formed.

In order to determine the incipient grounding of the high voltage electrostatic system, a ground return network 13 is connected between ground and the ground terminal 10a of the high voltage source 10. Current flowing from the charged electrode to the grounded article will be returned to the high voltage source through ground and the ground return network 13, and a signal will be developed by the ground return network at its output 13a. The signal generated in the ground return network is complex, being comprised of a plurality of DC and AC components as illustrated in 13b. The signal includes substantial 60-cycle portions including many higher harmonics. The complex signal is applied to a low pass operational network 14. The low pass operational network is comprised of the high gain DC amplifier connected to transform the input signal 13b with the transfer function $-HW_o^2/S^2+\alpha W_o S + W_o^2$.

The low pass operational network provides, for example, 20 db gain to DC signals and attenuates the AC components at 40 db per decade, being 3 db down at 10 hertz and having zero gain at about 30 hertz. Such a network effectively removes extraneous AC signals from the output of a low pass filter. Thus, in response to the approach of the grounded article 12 to the charged electrode 11 signal at the output 14a of the low pass operational network 14 is a signal which increases in value as the object approaches as shown at 14b. The increasing DC signal at the output 14a of the low pass operational amplifier 14 is sampled to provide two successive signals in different intervals of time for comparison. The sampling rate is determined by a clock circuit 15 which provides a series of gating impulses in more-or-less square wave form at its output 15a, as shown in 15b. The duration $t$ of each gate pulse, as shown in 15b, is selected to provide successive samples which occur rapidly enough so that comparison of these signals will provide a detectable increase in signal level under the most rapidly changing conditions to be anticipated.

The output of the clock circuit is applied to two gated sampling circuits 16 and 18. The first gated sampling circuit 16 is coupled to a holding circuit 17 and is gated by the clock circuit 15 during the first sampling interval $t1$. The signal 14b from the low pass operational network 14 is passed by the gated sampling circuit 16 and retained in holding circuit 17. Thus, at the output of the holding circuit 17a, the signal 17b rises until the end of gate interval $t1$ in response to signal 14b. At the end of time interval $t1$, the gating signal is removed from the input of the first gated sampling circuit and is applied to the second gated sampling circuit 18 for the time interval $t2$. The signal 14b, during time interval $t2$, is passed through the gated sampling circuit 18 and inverted by inverting circuit 19. The signal 19b appearing at the output 19a of the second gating sampling circuit and inverted circuit is a negative pulse representing in amplitude the signal 14b, which occurs during the interval $t2$.

The output signals 17b of the holding circuit and 19b of the inverting circuit represent those portions of the signal 14b which occur in the successive time intervals $t1$ and $t2$. These outputs are fed to a summing circuit 20. The instantaneous total or difference 20b at each instant of time of these signals 17b and 19b appear at the output of the summing circuit 20a. Signal 20b, corresponding to the output of the summing circuit, is applied to a level-detecting circuit 21. When the level of signal 20b reaches a level indicating that sparking may occur as shown at 20c, level-detecting circuit 21 produces an alarm signal 21b at its output 21a. This alarm signal can be used to actuate an alarm or disconnect the high voltage, or for any other such purpose.

The apparatus of FIG. 1 thus performs the method of operation of this invention. The electric current in the ground return to its high voltage electrostatic system is sensed to provide a signal. All alternating current components of the signal above substantially pure direct current are attenuated to provide a resulting DC signal that increases as a grounded article approaches a charged electrode. The resultant DC signal is sampled at a rate fast enough to anticipate the fastest expected approach of grounded article to the charged electrode. Every other sample is retained so that it may be compared with the sample immediately following it. The samples are compared in a summing circuit which provides a signal corresponding to the change in conditions in the ground return circuit. A level is selected corresponding to incipient grounding of the charged high voltage electrode. If a difference of the successive samples exceeds this level, an alarm is actuated providing a useful output.

Figure 2:
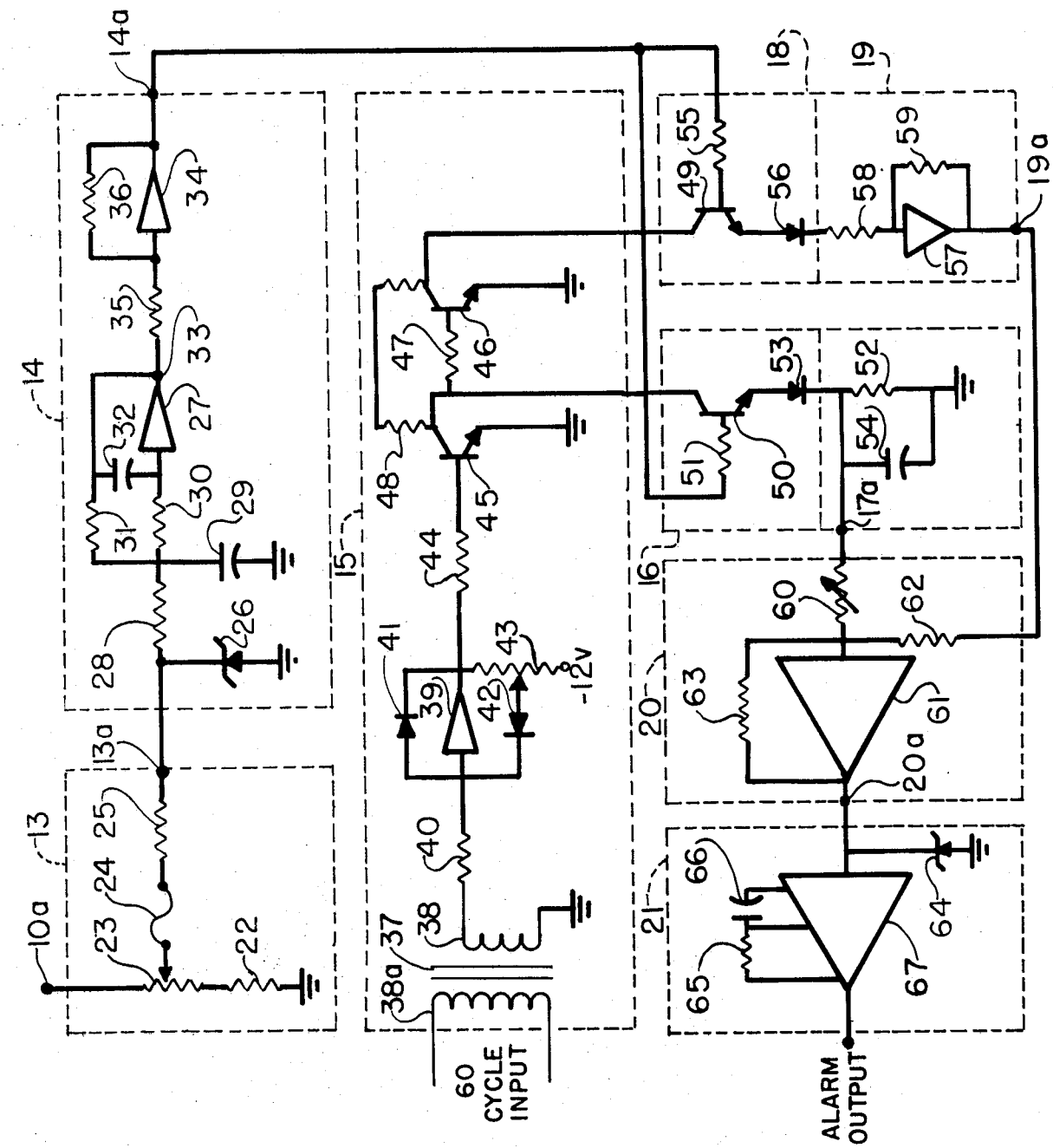
FIG. 2 is a diagrammatic illustration showing the major circuit elements within the functional blocks of FIG. 1.

FIG. 2 shows the apparatus of FIG. 1 in greater detail. The elements of the ground return network are shown within the dashed block 13 and include between ground and the ground terminal 10a of the high voltage source 10, a fixed and a variable resistor, 22 and 23 respectively. The variable resistor 23 is used to adjust the level of the signal which is generated at output 13a of the ground return network. The ground return network also includes a fuse 24 and a current limiting resistor 25 which functions with the input of the low pass operational network in the manner to be described.

The elements making up the low pass operational network include a zener diode 26. This zener diode, operating in conjunction with the current-limiting resistor 25 and the other components of the ground return network, prevents the signal applied at the input of the low pass operational network from exceeding a preselected voltage level, for example ± 12 volts. The low pass operational network uses an operational amplifier to transform the input signal in accordance with the transfer function set forth above. By "operational amplifier," I mean, for example, a Signetic Corporation N5741V type operational amplifier.

An active filter can be synthesized with the characteristics set forth above using operational amplifiers and design techniques known to those skilled in the art as, for example, taught in Operational Amplifiers - Design & Application, Burr-Brown Research Corp. 1971, Library of Congress No. 74-163297. Such an active filter having the desired characteristics and using one operational amplifier 27 is shown in FIG. 2. The plurality of resistances and capacitances connected at the output and the input of the operational amplifier and numbered 28, 29, 30, 31 and 32 generate from the terminal 26a to terminal 33 the desired transfer function. In this case, the signal at the output of the operational amplifier 33 is without any significant AC component. The signal at terminal 33 is a substantially total DC signal which will rise and fall as a grounded object approaches, or retreats from, the charged high voltage electrode of the electrostatic system. The typical values of such components which would provide the characteristics set forth above are resistor 28-11.3 kohms, capacitor 29-2.2 microfarads, resistor 31-113 kohms, capacitor 32- 0.1 microfarads, resistor 30-10.2 kohms. The output of the active filter is amplified by operational amplifier 34 and resistances 35 and 36 and presented at the output 14a of the low pass operational network 14.

Sampling of the signal at the output 14a of the low pass operational network 14 is provided by the clock circuit shown within the dashed lines representing blocks 15. The clock circuit includes a transformer 37. The primary of the transformer 38a is connected to a 60-cycle power source. The secondary 38b is connected to ground at one side; the other side is coupled to an operational amplifier 39 through a resistor 40. Feedback from the output of the operational amplifier 39 to its input is effected by two diodes 41 and 42. This circuit is connected to −12 volts through variable resistor 43. Diodes 41 and 42 and operational amplifier 39 form in the connection shown in FIG. 2 a 0 to +5 volt limiter circuit. The positive half-cycle of the AC line is omitted and the negative half-cycle is clipped at 5 volts, inverted by the operational amplifier, and formed into a square pulse to yield a 0 to +5 volt pulse of about 8 milliseconds.

The output of operational amplifier 39 is connected through the resistor 44 to transistor 45 which is driven into saturation by this signal on alternative half-cycles of the 60-cycle input.

When transistor 45 is not drive into saturation by the gate signal of the clock, transistor 46, by the action of resistors 47 and 48, is in saturation, effectively removing collector voltage from transistor 49 in the second gated sampling circuit within the dashed block 18. During this half-cycle of 60-cycle input to the clock (which corresponds to the time interval $t1$ as shown at 15b of FIG. 1), collector voltage is applied to transistor 50 of the first gated sampling circuit within the dashed block 16. The signal output of the low pass operational network 14, during this time interval $t1$, is applied to transistor 50 through resistor 51. This signal is amplified by transistor 50 and is integrated and stored by the holding circuit within dashed block 17 which includes a resistor 52 and capacitor 54. A diode 53, inserted between the emitter of transistor 50 and the holding circuit 17 protects the transistor 50. The resistor 52 connected across capacitor 54 provides the apparatus with the ability to detect relatively stationary conditions corresponding to incipient grounding of the high voltage charged electrode in a manner that will be explained below.

In the alternate half-cycle of the 60-cycle input (corresponding to $t2$ at 15b of FIG. 1), transistor 45 is in saturation, removing collector voltage from transistor 50; however, transistor 46 is not in saturation and collector voltage is applied to transistor 49 of the second gated sampling circuit 18. During interval $t2$, the signal from the output 14a of the low pass operational amplifier 14 is applied through resistor 55 in the second gated sampling circuit and protective diode 56 to an inverter circuit connected with transistor 49. The signal is transmitted to the inverting circuit within the dashed box 19, comprised of an operational amplifier 57, connected with resistors 58, 59 to perform the inversion-amplification function.

The signals at the outputs of the holding circuit 17a and of the inverting circuit 19a are fed to a summing circuit within the dashed box 20. The output of the holding circuit 17 passes through a variable resistor 60 to the operational amplifier 61. The output of the inverting circuit 19 is sent to the operational amplifier through resistor 62. A feedback resistor 63, in conjunction with the variable resistor 60, resistor 62 and the operational amplifier 61, sums and provides the net difference of the retained signal from interval $t1$ which appears at the output 17a of the holding circuit 17 and the signal during the interval $t2$ which appears at the output 19a of the inverter circuit 19. This difference appears at the output 20a of the summing circuit 20, but is inverted by operation of the circuit.

Level-detecting circuit within the dashed lines 21 detects when the difference between the signals which occur during interval $t1$ and which occur during $t2$ exceed a predetermined selected level that corresponds to incipient grounding of the high voltage electrostatic system. The level-detecting system may be of any kind sufficient to reliably detect a signal level. As shown in FIG. 2, level-detector circuit 21 includes zener diode 64 to hold the input to the monostable multivibrator 67 within predetermined voltage limits, for example ±5 volts. The monostable multivibrator 67, connected with resistors 65 and capacitors 66, will trigger if the level applied exceeds a predetermined preset value.

To provide an apparatus which will detect slowly moving or stationary conditions, suddenly imposed and representing incipient grounding of the high voltage electrostatic system, resistor 52 is connected across capacitor 54 in the holding circuit 17. During the interval $t2$, resistor 52 bleeds the stored charge from capacitor 54 that represents the integrated signals occurring during that period $t1$. The charge bled through the resistor reduces, during time interval $t2$, the level of the signal at the output of the holding circuit 17a to be summed with the inverted signal appearing at the output 19a of the inverter circuit, and results in an increased difference at the output of the summing circuit 20a. Thus, if incipient grounding of the high voltage electrostatic electrode is suddenly imposed by a very rapidly moving grounded object in a period less than the sampling interval (which in the device illustrated in FIG. 2 is 1/120th of a second) that subsequently remains relatively stationary, a large difference signal will nevertheless be generated by the apparatus and actuate the level-detecting circuit to provide an alarm.

Figure 3:
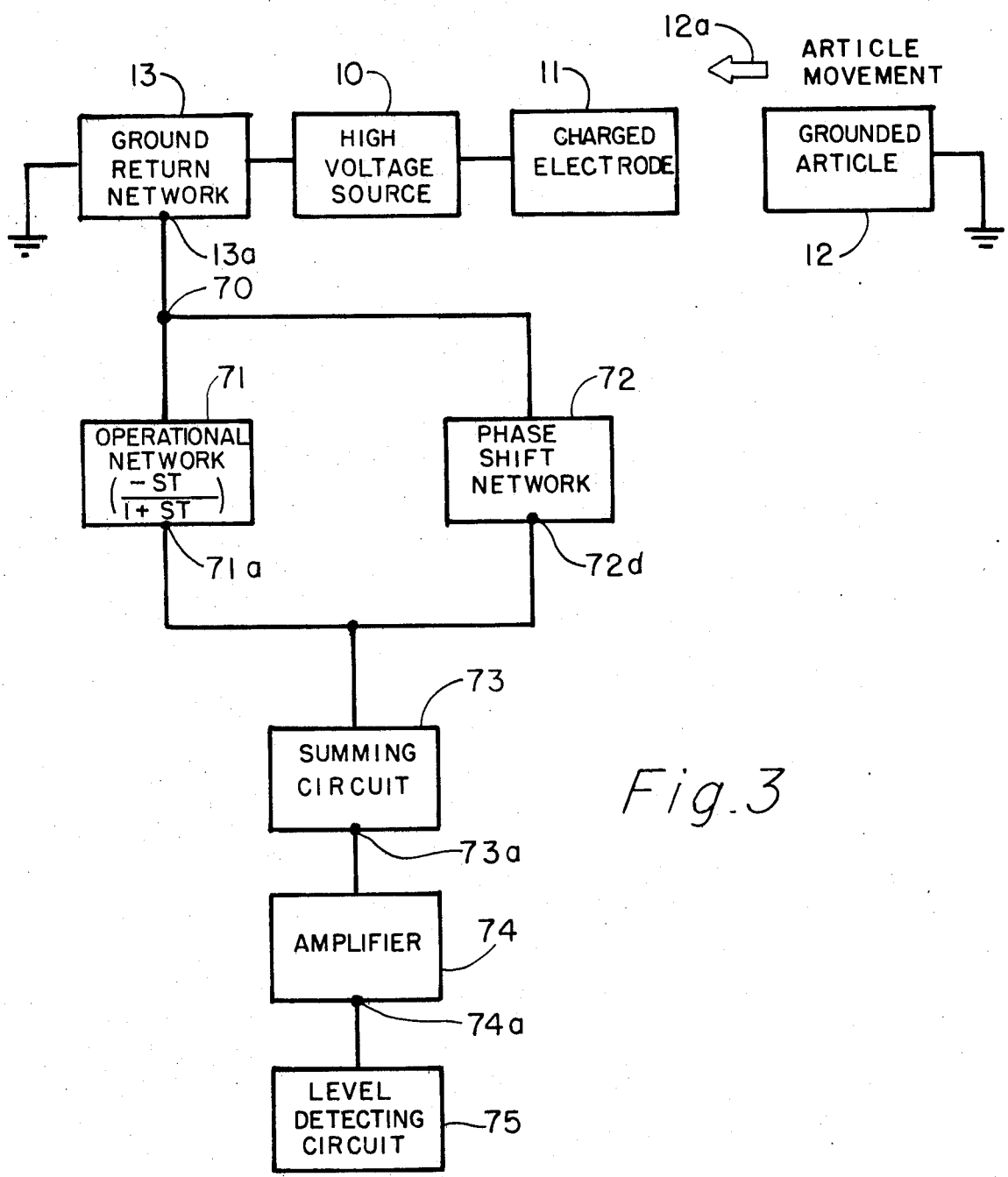
FIG. 3 is a block diagram showing the major components of another apparatus of this invention.

FIG. 3 shows a high voltage electrostatic system using another embodiment of this invention. This system, like that of FIG. 1, includes a high voltage source 10, a charged high voltage electrode 11 and a grounded article 12. The grounded article 12 is free to move in the direction of the charged electrode 11 as shown by arrow 12a. As indicated above, movement of the grounded article 12 in the direction of charged electrode 11 will result in a spark unless the incipient grounding condition is detected.

Like the embodiment shown in FIG. 1, a ground return network 13 is connected between ground and the ground terminal 10a of the high voltage source 10. Current flowing from the charged electrode to the grounded article will be returned to the high voltage source through the ground and ground return network 13, and a signal will be developed by the ground return network at its output 13a. As indicated before, this signal is complex, being comprised of a plurality of DC and AC components as illustrated in 13b of FIG. 1. The apparatus shown in FIG. 3 operates on this complex signal to determine incipient grounding conditions.

The ground return signal at terminal 13a of the ground return network is split at 70 into two channels. In the first channel an operational network 71 transforms the signal by the transfer function $$\frac{-ST}{1+ST}$$

This transfer function eliminates the DC signals from its output 71a and like all networks, provides a phase shift to the signal.

The second channel includes an operational phase shift network 72 which passes the entire signal at the output of the ground return network with virtually the same amplification and phase shift as operational network 71 imposes upon the AC components of the signal.

As a result of the operation of operational network 71, the output at 71a of the first channel is an amplified inversion of the AC components present in the signal. At the output 72a of the second channel, the entire signal is present with the same amplification and delay of the first channel. The signals from the first and second channels are sent to a summing network 73 whose output at 73a is, therefore, essentially a DC signal. This signal is amplified by signal 74 whose output 74a is connected to a level-detecting circuit 75 of any appropriate type.

The apparatus of FIG. 3 thus performs the method of operation of this invention. The electric current in the ground return to its high voltage electrostatic system is sensed to provide a signal. All alternating current components of the signal above substantially DC are attenuated to provide a resulting DC signal that increases as the grounded article approaches the charged electrode. This signal is generated by splitting the signal into two channels, one of which amplifies and inverts only the AC components of the signal, which are then summed with the signal in the other channel which uniformly amplifies the entire signal to the same degree as the first channel. The signals are summed to provide a signal corresponding to the change in condition in the ground return circuit. A level is selected corresponding to incipient grounding of the charged high voltage electrode and providing a useful output if the amplified signal exceeds this level.

Figure 4:
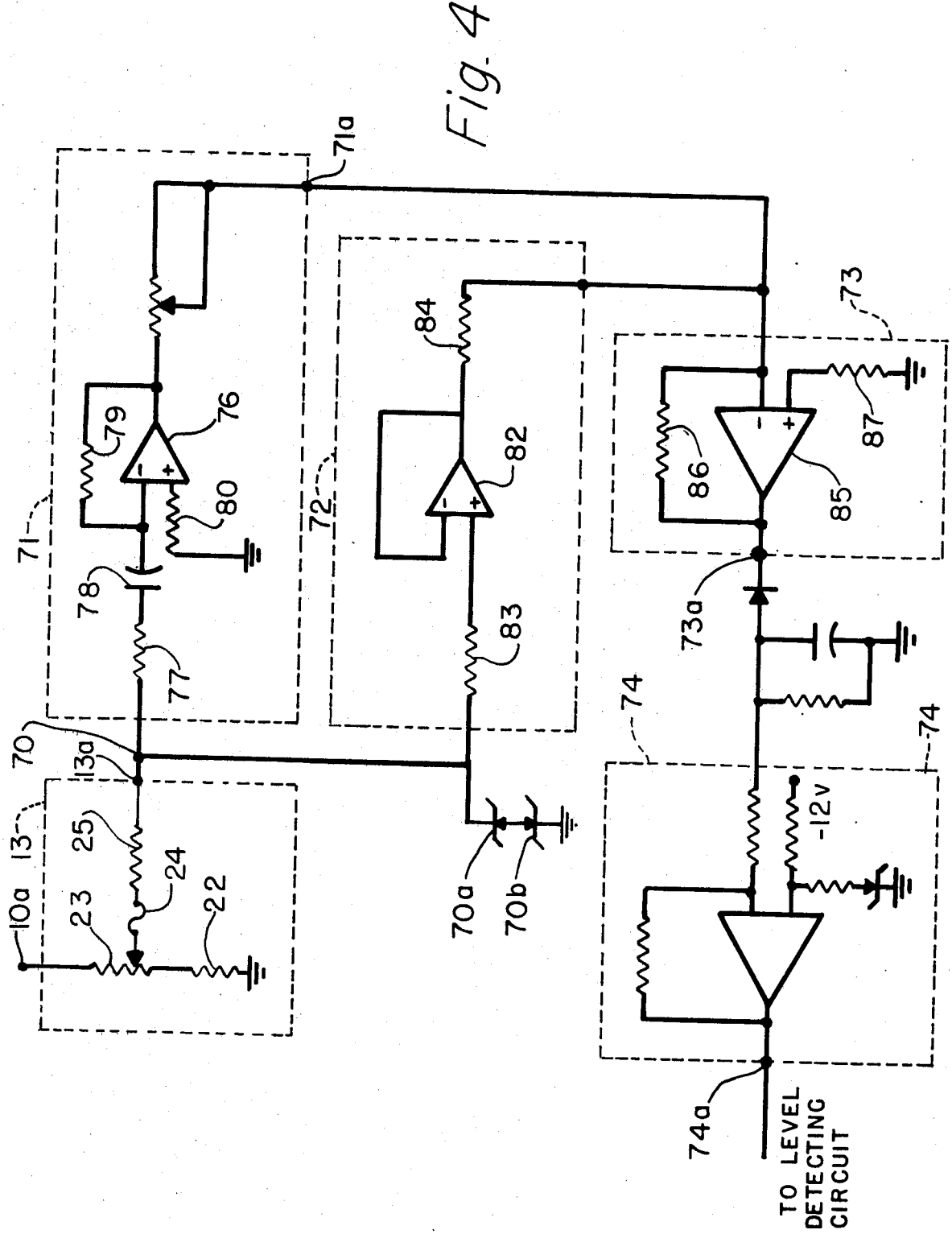
FIG. 4 is a diagrammatic illustration showing the major circuit components within the functional blocks of FIG. 3.

FIG. 4 shows the apparatus of FIG. 3 in greater detail. The elements of the ground return network are shown within the dashed block 13 and are described above. The elements making up the operational network in dashed blocks 71 are synthesized to provide the transfer function $$\frac{-ST}{1+ST}$$

using operational amplifiers and the design techniques as, for example, taught in "Operational Amplifiers — Design and Application" (identified above), using one operational amplifier 76. Zener diodes 70a and 70b are connected to terminal 70 to prevent the signal at terminal 70 from exceeding preselected levels. The plurality and resistances and capacitances 77, 78, 79, and 81 generate between terminal 70 and terminal 71a the desired transfer function. This operational network attenuates the DC components of the complex signal 13b and segregates its AC components.

The signal at terminal 70 is also applied to the phase shift network shown within dashed block 72, including an operational amplifier 82 and resistors 83 and 84. The function of this phase shift network is to provide amplification of the entire signal at terminal 70 and a phase shift corresponding to that imposed on the signal by operational network 71. The outputs of operational networks 71 and phase shift network 72 are summed by a summing circuit shown within the dashed outline 73 which includes operational amplifier 85 and resistors 86 and 87. Resistors 80 and 87 are to provide temperature stability and do not contribute to the overall transfer function of the circuit. The output at 73a is a signal that is substantially pure DC. The AC components of the signal have been cancelled by virtue of the operations of operational networks 71 and 72 and the summing circuit 73. The resultant DC signal is related to the approach of a grounded article to the high voltage electrode.

This signal is amplified by the amplifier in dashed block 74 and fed to a level-detecting circuit which can be set to be actuated at a signal level corresponding to incipient grounding conditions.

Though I have shown specific circuits in describing the methods and apparatus of my invention, it will be apparent that other specific circuits may be devised to practice the invention.

I claim:

1. A method of determining incipient grounding of the high voltage electrode in an electrostatic coating system, including a high voltage source, a charged high voltage electrode and a grounded article comprising sensing the electrical current returning from ground to the high voltage source and developing a signal with a component related to an incipient grounding condition;

splitting the developed signal into two channels;

independently operating on the developed signal in each of the two channels to develop different signal components at the channel outputs;

combining the different signal components to develop the component relating to an incipient grounding condition, and detecting the level of the signal component relating to incipient grounding.

2. The method of claim 1, wherein the signal in one channel is transformed by the transfer function $-ST/1+ST$; the signal in the other channel is given an amplification and phase shift corresponding to the first channel, and the resulting different signal components are combined to cancel the AC components and develop a signal relating to an incipient grounding condition.

3. The method of claim 1, wherein the sensed signal is developed by transforming it with the transfer function $-HWo^2/(S^2+\alpha WoS+Wo^2)$, the transformed signal is sampled in successive time intervals to provide two signal components in alternate time intervals, the signal component in one alternate time interval being retained in one channel and the signal components in the other alternate time interval being inverted in the other channel, and the resulting signal components being combined to compare the levels of the signal current in successive time intervals to develop a signal relating to an incipient grounding condition.

4. In a method of operating an electrostatic coating system having a highly charged electrode capable of disruptive electrical discharges upon experiencing an impending grounded condition which includes the steps of sensing the electric current returning from ground to the high voltage source connected to the electrode, determining when the sensed ground return current exceed a predetermined level and disconnecting the electrode from the high voltage source, the improvement comprising attenuating all alternating electrical current components of the ground return current to provide an essentially pure direct current signal, sampling the signal at a designated rate to provide samples from successive time intervals faster than the anticipated rate of grounding, comparing the levels of the signal current in consecutive samples to determine that the signal current is rising at a predetermined rate corresponding to an impending grounded condition, and generating an operative signal if the rate of rise exceeds a predetermined level.

5. The method of claim 4, wherein the improvement includes holding the sample from one time interval for comparison with the sample from the successive time intervals and subtracting from the retained sample, a portion that is proportional to its magnitude.

6. The method set forth in claim 4, wherein the improvement comprises attenuating at a rate of 40 db per decade, all AC components of the signal above 10 Hertz, while providing a 20 db gain to all DC signals.

7. The method set forth in claim 4, wherein the improvement comprises sampling the signal current 120 times per second.

8. An apparatus for use in a high voltage electrostatic system comprising means to generate a signal including the current between a charged high voltage electrode and a grounded electrode that is free to move towards the high voltage electrode, means to attenuate all electrical current components of said signal above substantially pure direct current and to provide the amplified DC portion of said signal, means to sample the amplified DC portion of said signal to provide samples from successive time intervals faster than the anticipated rate of approach of the grounded electrode to the high voltage electrode, means to compare the levels of the signals from successive time intervals, and means to determine if the comparison of the signal from the successive time intervals indicate incipient grounding of the high voltage electrode.

9. Apparatus to determine the incipient grounding of the high voltage electrode of an electrostatic coating system including a high voltage source, a high voltage electrode, and a grounded article comprising
means to sense the electrical current returning from ground to the high voltage source and to develop a signal with a component related to an incipient grounding condition;
means to split the developed signal into two channels
means forming two separate and independent signal channels and performing independent operations in each channel to develop different signal components at each channel output;
means to combine the different signal components to develop the component relating to an incipient grounding condition; and
means to detect the level of the signal component corresponding to incipient grounding.

10. The apparatus of claim 9, wherein the means to sense the electrical current returning from ground to the high voltage source and to develop the signal includes an operational amplifier connected to transform the signal developed across resistance connected from ground to the ground return of the high voltage source by the transfer function $-HW_o^2/(S^2+\alpha W_oS+W_o^2)$, the means to split the developed signal into two channels includes a clock circuit to create a series of successive time intervals and two gated sampling circuits triggered alternatively in successive time intervals thereby, the means forming two separate and independent signal channels includes a holding circuit to retain the developed signal from one time interval and an independent inverting circuit to invert the developed signal in the successive time intervals, and the means to combine the retained signal and the inverted signal includes a summing circuit.

11. The apparatus of claim 9 wherein one of the two separate and independent signal channels includes an operational amplifier connected to transform the signal developed across resistance connected from ground to the ground return of the high voltage source by the transfer function $-ST/1+ST$ to provide one signal component, and the other channel includes an operational amplifier connected to provide only the amplification and phase shift of the first channel to provide the other signal component, and the means to combine the different signal components includes a summing circuit.

* * * * *